Patented Apr. 3, 1928.

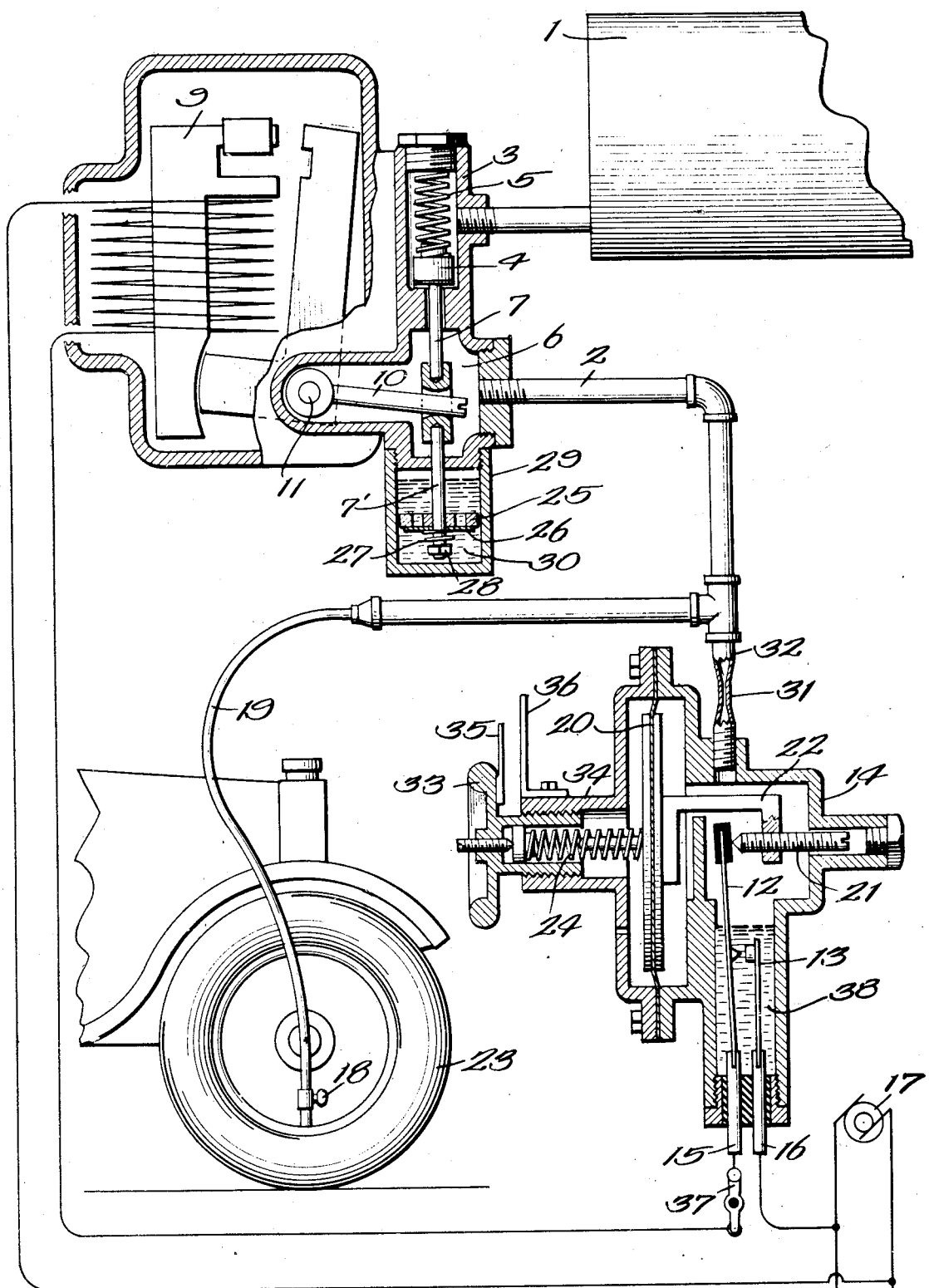

1,664,719

UNITED STATES PATENT OFFICE.

JOE C. WOODFORD, OF OSKALOOSA, IOWA.

APPARATUS FOR SUPPLYING AIR UNDER PRESSURE.

Application filed June 3, 1926. Serial No. 113,591.

My invention relates to apparatus for supplying air to receivers from sources containing air at higher pressures than the pressures of the air that is to be contained in the receivers. My invention is of particular service in supplying air to pneumatic tires for vehicle wheels.

In carrying out my invention, I include a valve between a source of air under desired high pressure and the piping which is to convey the air to the tire or other receiver. This valve is constrained to move in a closing direction and preferably has facility or means for retarding its closing movement to afford an interval in which air may flow through the piping to the receiver under the pressure at the source. I also provide mechanism in controlling relation to the valve and constrained to effect an opening adjustment of the valve. Means are supplied to the valve controlling mechanism to prevent it from having valve opening effect when the valve is closing. This means desirably resides in a pneumatic device which receives air from said piping while the valve is open and the tire is being supplied, the air admitted to the valve controlling pneumatic mechanism then being under sufficient pressure to prevent the valve controlling mechanism from having valve opening influence. When the valve is closed, the pressure of the air admitted to the valve controlling mechanism will be sufficiently reduced, under the assumption that the tire has not been filled to the desired extent, to permit the valve controlling mechanism to cause the valve to open. The valve is intermittently operated until the tire has been filled to the desired extent, the pressure of the air in the filled tire being rendered sufficient, by suitable adjustment of the valve controlling mechanism, to prevent the valve controlling mechanism from having valve opening effect, whereupon the valve remains closed and the tire is disconnected. The amount of air to be received in the tire may be regulated by adjusting the valve opening constraint or influence of the valve controlling mechanism, such constraint being overcome to permit the valve to remain closed when the tire is filled to the extent determined by this adjustment. I desirably constrict the passage through which the valve controlling mechanism is supplied with air to supplement the function of the valve retarding means and to prevent sudden action due to surging. The constriction in the piping or passage serves to throttle the air in its flow both to and from the valve controlling mechanism.

In one embodiment of my invention I have supplied the valve with an extraneous means, for retarding its closing action, in the form of a dash pot so arranged as to permit quick opening actions of the valve during the tire filling process. In the preferred embodiment of the invention a diaphragm chamber is employed which receives air from the supply piping on one side of the diaphragm in the chamber. A regulable spring exerts pressure upon the other side of the diaphragm and is effective to enable the opening action of the valve upon sufficient reduction of the pressure of the air upon the first side of the diaphragm. The valve may be coupled with the armature of an electromagnet whose circuit is closed by a switch whose closure is enabled by the spring when the diaphragm permits the spring to act consequent upon sufficient reduction of air pressure upon the diaphragm.

I will explain my invention more fully by reference to the accompanying drawing which somewhat diagrammatically illustrates the preferred embodiment thereof.

The tank 1 is a source containing air under pressure that is much higher than that which is to be supplied to pneumatic tires or other receivers. Air is supplied from this tank by way of piping 2. The air passes from the tank into the valve chamber 3 which is connected at its inlet end to the tank and at its outlet end with said piping. A valve 4 is located within the valve chamber and is pressed upon by a spring 5 in a closing direction, said valve being constrained by the spring to close. The valve chamber is inclusive of an enlargement 6 thereof into which the valve stem 7 projects, there being clearance surrounding the valve stem through which air may flow. An electro-magnet 9 is provided for opening the valve, the armature of the magnet carrying an operating arm 10 which is fixed upon the armature shaft 11 that passes into the valve chamber portion 6 through air tight bearings. When the magnet is energized the arm 10 is turned to move the valve stem 7 and the valve 4 in a valve opening direction against the force of the spring 5 to permit air to flow through the piping 2, the action of the magnet being stronger than the effect of the spring. The arm 10 desirably has slight lost motion relation with said valve stem. The circuit of the magnet includes a controlling switch that employs an operating switch contact arm 12 and a contact member 13, complemental to this arm.

The switch members 12 and 13 are located within an air chamber 14, there being suitable air tight circuit connections 15, 16, extending through the chamber and including the switch members in circuit with a suitable source of current 17. If the piping is supplied with an outlet valve, such as that indicated at 18 in connection with the pipe 19 branching from the piping 2, this valve 18 is normally closed to trap air under sufficient pressure within the chamber 14 to hold the switch arm 12 away from the contact 13 when the apparatus is not in use, a result which is secured with the aid of a diaphragm 20 which is subject to the pressure of the air in said chamber and which moves the switch arm 12 from its contact 13, when this pressure is sufficient, through the intermediation of the abutment screw 21 that then presses the switch arm 12 away from contact 13, this abutment screw being carried upon a bracket 22 that is provided upon the diaphragm. When air is to be supplied to the tire or receiver 23, the branch pipe 19 is first connected with the tire nipple whereafter the valve 18 is opened. When this valve is opened, the pressure in the chamber 14 is reduced to permit the spring 24 to move the diaphragm 20 in a direction to move the abutment 21 out of actuating engagement with the switch arm 12. When the abutment 21 is thus withdrawn from the switch arm 12, this switch arm engages its contact 13, the switch arm being constrained to move in a switch closing direction by reason of its own resilience. When the switch 12, 13 is closed, the circuit of the magnet 9 is closed to open the valve 4 whereupon air passes through the piping 2 to the tire 23. Air pressure will now build up in chamber 14 to open the switch 12, 13. The switch 12, 13, being still open, the valve 4 is moved in a closing direction by the spring 5. This valve closing movement is delayed by a retarding means or facility which is preferably inclusive of a horizontal apertured plate 25, a valve disc 26 pressed against the under side of this plate by a spring 27 to close the apertures in the plate, an abutment 28 upon a continuation 7' of the valve stem 7 and the dash pot 29 in fluid tight connection with the valve chamber enlargement 6. This dash pot contains oil 30 which seeps slowly through the annular clearance between the plate 25 and pot 29 when the spring 5 is closing the valve 4. Valve disc 26 moves from plate 25 when valve 4 is opened to permit quick valve opening movement.

During the slow closure of the valve 4, air also flows from the chamber 14 toward the tire and piping 2, a sufficient reduction in the pressure of the air in the chamber 14 resulting, under the assumption that the tire has not yet received sufficient air, to permit the spring 24 to move the diaphragm 20 in a direction to permit contacts 12 and 13 to close circuit through the magnet 9 to open the valve 4. The volume of the air in the piping 2 may be sufficient to prevent rapid egress of the air from chamber 14 thereby to delay opening action upon the valve 4 until this valve is closed. To ensure a sufficient retardation of the opening of the valve 4, I preferably provide a constriction 31 in the pipe portion 32 that connects the chamber 14 with the piping 2, though the invention is not to be limited to this means for taking part in retarding the opening action of valve 4 during the closing movement of this valve. The choke 31 throttles the flow of air into as well as from the diaphragm chamber so that it also serves to prevent the air from being blasted into the chamber 14 and causing an opening of the contacts 12, 13 before the valve 4 is fully open. The choke or constriction 31 also takes part in retarding the closure of the valve 4 as hitherto set forth. Intermittent operation of valve 4 obtains until the tire is sufficiently filled, whereupon this valve will remain closed. The amount of air to be received in the tire may be regulated by regulating the force of the spring 24 which may be accomplished by means of a handle 33 whose hub is in threaded connection with the spring receiving extension 34 of chamber 14 and defines the position of the outer end of said spring. An index 35 upon the handle is placed opposite a selected scale mark upon the scale 36 which corresponds to the pressure desired for the air in the tire.

If the pipe 19 is unequipped with the valve 18, the contents 12 and 13 will be closed when said pipe is disconnected from the tire. The circuit of the magnet 9 is then opened at the switch 37, this switch being closed when the apparatus is put into use. Oil 38 surrounds the contacts 12 and 13 to prevent arcing.

Changes may be made without departing from the invention.

Having thus described my invention, I claim:

1. The combination with a source of air under pressure; of piping through which air is conveyed from said source to a receiver; a valve between said source and piping, constrained to move in a closing direction and having means for retarding its closing movement; and mechanism in controlling relation to the valve and constrained to effect an opening adjustment of the valve and connected with said piping and operable by air admitted thereto from the piping to delay the valve opening effect of said mechanism when the valve is closing, said mechanism effecting opening adjustment of the valve upon sufficient reduction of the pressure of the air admitted thereto.

2. The combination with a source of air under pressure; of piping through which air is conveyed from said source to a receiver; a valve between said source and piping, constrained to move in a closing direction and having means for retarding its closing movement; and mechanism in controlling relation to the valve and constrained to effect an opening adjustment of the valve and connected with said piping and operable by air admitted thereto from the piping to oppose the valve opening effect of said mechanism when the valve is closing, said mechanism effecting opening adjustment of the valve upon sufficient reduction of the pressure of the air admitted thereto and having its connection with the piping constricted to retard the passage of air therefrom to delay the valve opening effect thereof.

3. The combination with a source of air under pressure; of piping through which air is conveyed from said source to a receiver; a valve between said source and piping, constrained to move in a closing direction and having means for retarding its closing movement; and mechanism in controlling relation to the valve and constrained to effect an opening adjustment of the valve and connected with said piping and operable by air admitted thereto from the piping to oppose the valve opening effect of said mechanism when the valve is closing, said mechanism effecting opening adjustment of the valve upon sufficient reduction of the pressure of the air admitted thereto and being provided with means for delaying the valve opening effect thereof.

4. The combination with a source of air under pressure; of piping through which air is conveyed from said source to a receiver; a valve between said source and piping, constrained to move in a closing direction and having means for retarding its closing movement; and mechanism in controlling relation to the valve and inclusive of a diaphragm chamber and a diaphragm, within the chamber, constrained and related to effect an opening adjustment of the valve, said chamber being connected with said piping on one side of the diaphragm to render the diaphragm operable by air admitted to said chamber from the piping to delay the valve opening effect of said mechanism when the valve is closing, said diaphragm effecting opening adjustment of the valve upon sufficient reduction of the pressure of the air admitted to said chamber.

5. The combination with a source of air under pressure; of piping through which air is conveyed from said source to a receiver; a valve between said source and piping, constrained to move in a closing direction and having means for retarding its closing movement; and mechanism in controlling relation to the valve and inclusive of a diaphragm chamber and a diaphragm, within the chamber, constrained and related to effect an opening adjustment of the valve, said chamber being connected with said piping on one side of the diaphragm to render the diaphragm operable by air admitted to said chamber from the piping to oppose the valve opening effect of said mechanism when the valve is closing, said diaphragm effecting opening adjustment of the valve upon sufficient reduction of the pressure of the air admitted to said chamber, said chamber having its connection with the piping constricted to retard the passage of air therefrom to delay the valve opening effect of the diaphragm.

6. The combination with a source of air under pressure; of piping through which air is conveyed from said source to a receiver; a valve between said source and piping, constrained to move in a closing direction and having means for retarding its closing movement; and mechanism in controlling relation to the valve and inclusive of a diaphragm chamber and a diaphragm, within the chamber, constrained and related to effect an opening adjustment of the valve, said chamber being connected with said piping on one side of the diaphragm to render the diaphragm operable by air admitted to said chamber from the piping to oppose the valve opening effect of said mechanism when the valve is closing, said diaphragm effecting opening adjustment of the valve upon sufficient reduction of the pressure of the air admitted to said chamber, said diaphragm being supplied with means for delaying the valve opening effect thereof.

7. The combination with a source of air under pressure; of piping through which air is conveyed from said source to a receiver; a valve between said source and piping, constrained to move in a closing direction and having means for retarding its closing movement; and mechanism in controlling relation to the valve and inclusive of an electro-magnet coupled with the valve and operating to open the valve, when energized, a switch for opening and closing the magnet circuit, a diaphragm chamber, a diaphragm, within the chamber, constrained and related to effect closure of the switch to open the valve, said chamber being connected with said piping on one side of the diaphragm to render the diaphragm operable by air admitted to said chamber from the piping to oppose and delay the switch closing effect of said diaphragm when the valve is closing, said diaphragm effecting closure of the switch upon sufficient reduction of the pressure of the air admitted to said chamber.

8. The combination with a source of air under pressure; of piping through which air is conveyed from said source to a receiver; a valve between said source and piping, constrained to move in a closing direction and having means for retarding its closing movement; and mechanism in controlling relation to the valve and inclusive of an electromagnet coupled with the valve and operating to open the valve, when energized, a switch for opening and closing the magnet circuit, a diaphragm chamber, a diaphragm, within the chamber, constrained and related to effect closure of the switch to open the valve, said chamber being connected with said piping on one side of the diaphragm to render the diaphragm operable by air admitted to said chamber from the piping to oppose the switch closing effect of said diaphragm when the valve is closing, said diaphragm effecting closure of the switch upon sufficient reduction of the pressure of the air admitted to said chamber, said chamber having its connection with the piping constricted to retard the passage of air therefrom to delay the valve opening effect of the diaphragm.

9. The combination with a source of air under pressure; of piping through which air is conveyed from said source to a receiver; a valve between said source and piping, constrained to move in a closing direction and having means for retarding its closing movement; and mechanism in controlling relation to the valve and inclusive of an electro-magnet coupled with the valve and operating to open the valve, when energized, a switch for opening and closing the magnet circuit, a diaphragm chamber, a diaphragm, within the chamber, constrained and related to effect closure of the switch to open the valve, said chamber being connected with said piping on one side of the diaphragm to render the diaphragm operable by air admitted to said chamber from the piping to oppose the switch closing effect of said diaphragm when the valve is closing, said diaphragm effecting closure of the switch upon sufficient reduction of the pressure of the air admitted to said chamber, said diaphragm being supplied with means for delaying the valve opening effect thereof.

10. The combination with a source of air under pressure; of piping through which air is conveyed from said source to a receiver; a valve between said source and piping, constrained to move in a closing direction; means retarding the closing movement of the valve, and mechanism in controlling relation to the valve and constrained to effect an opening adjustment of the valve and connected with said piping and reversely operable by air admitted thereto from the piping, said mechanism effecting opening adjustment of the valve upon sufficient reduction of the pressure of the air admitted thereto and having its connection with the piping constricted to throttle the flow of air both into and from the valve controlling mechanism, whereby the closure of the valve is retarded and the valve-opening effect of said valve-controlling mechanism is delayed to permit the valve to close.

In witness whereof, I hereunto subscribe my name.

JOE C. WOODFORD.